United States Patent
Hogdal et al.

(10) Patent No.: US 6,766,472 B2
(45) Date of Patent: Jul. 20, 2004

(54) SYSTEMS AND METHODS FOR REPLICATING VIRTUAL MEMORY ON A HOST COMPUTER AND DEBUGGING USING THE REPLICATED MEMORY

(75) Inventors: Gregory Hogdal, Sammamish, WA (US); John R. Eldridge, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 601 days.

(21) Appl. No.: 09/865,934

(22) Filed: May 24, 2001

(65) Prior Publication Data

US 2002/0038437 A1 Mar. 28, 2002

Related U.S. Application Data

(60) Provisional application No. 60/234,643, filed on Sep. 22, 2000.

(51) Int. Cl.[7] .................................................. G06F 11/00
(52) U.S. Cl. ................................ 714/25; 714/27; 711/6
(58) Field of Search ........................... 714/25, 9, 5, 38, 714/33, 27; 711/6, 203, 205, 206, 207, 147, 162; 717/127, 124

(56) References Cited

U.S. PATENT DOCUMENTS

| | | | | |
|---|---|---|---|---|
| 5,247,629 A | * | 9/1993 | Casamatta et al. | 711/206 |
| 5,390,316 A | * | 2/1995 | Cramer et al. | 709/201 |
| 5,592,625 A | * | 1/1997 | Sandberg | 711/147 |
| 5,887,164 A | * | 3/1999 | Gupta | 713/2 |
| 5,897,664 A | * | 4/1999 | Nesheim et al. | 711/206 |
| 6,094,530 A | * | 7/2000 | Brandewie | 717/127 |
| 6,182,195 B1 | * | 1/2001 | Laudon et al. | 711/141 |
| 6,223,270 B1 | * | 4/2001 | Chesson et al. | 711/202 |
| 6,446,094 B1 | * | 9/2002 | Egolf et al. | 707/206 |
| 6,457,109 B1 | * | 9/2002 | Milillo et al. | 711/162 |
| 6,480,845 B1 | * | 11/2002 | Egolf et al. | 707/6 |
| 6,490,671 B1 | * | 12/2002 | Frank et al. | 711/207 |
| 6,594,751 B1 | * | 7/2003 | Leivent | 711/209 |
| 6,671,688 B1 | * | 12/2003 | Nikols et al. | 707/10 |
| 6,691,250 B1 | * | 2/2004 | Chandiramani et al. | 714/25 |
| 2002/0078404 A1 | * | 6/2002 | Vachon et al. | 714/38 |
| 2003/0088752 A1 | * | 5/2003 | Harman | 711/202 |
| 2003/0200413 A1 | * | 10/2003 | Gurumoorthy et al. | 711/206 |

* cited by examiner

Primary Examiner—Robert Beausoliel
Assistant Examiner—Christopher S. McCarthy
(74) Attorney, Agent, or Firm—Lee & Hayes, PLLC

(57) ABSTRACT

Systems and methods are described for replicating virtual memory translation from a target computer on a host computer, and debugging a fault that occurred on the target computer on the host computer. The described techniques are utilized on a target computer having a processor that has halted execution. Virtual to physical address translation data from the target computer is transferred to the host computer. The host computer utilizes the virtual to physical address translation data to access data pointed by virtual memory addresses that were used by the target computer, and then debugs a fault by accessing the data by reading the physical memory address on the host computer. After the virtual to physical memory address translation data have been acquired, they can be cached at the host computer.

30 Claims, 4 Drawing Sheets

SYSTEMS AND METHODS FOR
REPLICATING VIRTUAL MEMORY ON A
HOST COMPUTER AND DEBUGGING
USING THE REPLICATED MEMORY

This application claims the benefit of Provisional Application No. 60/234,643 filed Sep. 22, 2000.

TECHNICAL FIELD

The systems and methods described herein relate to debugging computing systems and, more particularly, to debugging a target computing system replicating target virtual memory translation on a host computer and debugging on the host.

BACKGROUND

As computing technology has advanced, the size of computer software applications and the operating systems that run them has grown larger and larger. As the size of the software has increased, so had the demand that is placed on the memory required to support these programs. To deal with the need for an increased number of addressed memory space, the concept of virtual memory was developed. Today, virtually all modem operating systems provide a form of virtual memory to applications.

One newly developed operating system that utilizes virtual memory management is the WINDOWS CE operating system produced by MICROSOFT CORP. WINDOWS CE is a lightweight operating system that is ideal for use in PDAs (Personal Digital Assistants), hand-held computers, palm computers, electronic appliances and the like. WINDOWS CE provides a page-based virtual memory management scheme that allows applications to realize a 32-bit linear address space for four (4) gigabytes (GB) of memory.

A system that utilizes a virtual memory scheme poses a particular problem when the system fails and an attempt is made to debug the system. To debug a system, a software program is used to examine the contents of the system's memory and registers to determine a problem with a system. Debuggers require that a virtual memory-based system that is being debugged be operational because the debugging software at least requires the CPU to execute the software. However, there are situations in which the system is not operational, i.e., the CPU will not execute the debugging code, where it is necessary or desirable to execute debugging code to determine the cause of a system fault. Such a situation arises when using hardware-assisted debugging equipment that completely freezes the system in order to debug it, or when a snapshot of the system is taken to be debugged at a later time (this is referred to as "post-mortem" debugging).

When such a situation arises, it is impossible to rely on the kernel of the operating system to handle a page fault exception to load a missing page when a virtual memory location not currently loaded is accessed for debugging purposes.

SUMMARY

Systems and methods are described herein that provide a means for a host computer to describe a translation equivalent of one typically performed by CPU table look-aside buffer (TLB) registers of a target computer, after the kernel of the target computer has added the mapping of a page required by the debugger, in the CPU TLB. A host-side application locally replicates the mechanism normally used by the kernel of the target computer to map a virtual address into a physical address. After such a translation is accomplished on the host computer, debugging can be performed on the host computer.

The host-side virtual to physical address translation assumes the following environment:
(1) The target system is running on a CPU that supports fixed paged memory management;
(2) The target system is running an operating system that enables and uses the paged memory management;
(3) The target operating system memory management is table driven or has hard-coded logic; and
(4) The tables used by the target operating system memory management (if applicable) are located either in a known address range of physical memory, or in a known address range of the virtual memory whose pages have been locked (so their addresses are translatable by looking up the current CPU TLB).

In accordance with the present invention, the host-side virtual to physical address translation performs the following major tasks:
(1) determining if the memory management of the CPU is enabled or not (in which case the following tasks are not necessary);
(2) locating the data (tables) used by the kernel of the target system directly to perform the translation;
(3) replicating locally the data (tables) used by the kernel of the target system to perform the translation;
(4) checking the validity of the data (tables) used by the kernel of the target system to perform the translation;
(5) in the case that the data (tables) used by the kernel of the target system to perform the translation are valid, they can be used to perform the translation on the host side; and
(6) cache the data for future use (optional).

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1:
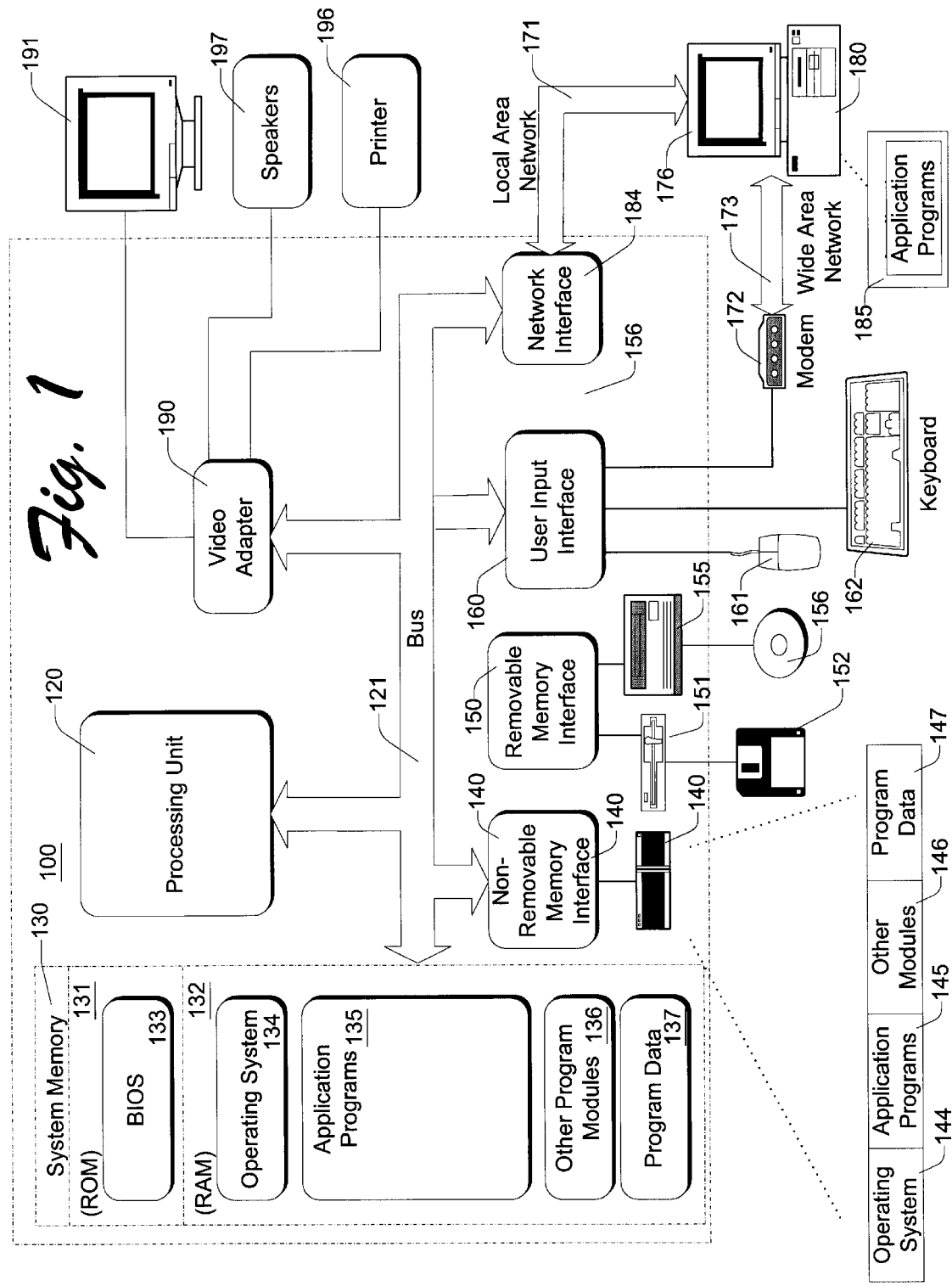
FIG. 1 is an exemplary computer system on which the present invention may be implemented.

The invention is illustrated in the drawings as being implemented in a suitable computing environment. Although not required, the invention will be described in the general context of computer-executable instructions, such as program modules, to be executed by a computing device, such as a personal computer or a hand-held computer or electronic device. Generally, program modules include routines, programs, objects, components, data structures, etc. that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Exemplary Computer Environment

The various components and functionality described herein are implemented with a number of individual computers. FIG. 1 shows components of typical example of such a computer, referred by to reference numeral 100. The components shown in FIG. 1 are only examples, and are not intended to suggest any limitation as to the scope of the functionality of the invention; the invention is not necessarily dependent on the features shown in FIG. 1. In addition, the fact that a personal computer and its components is depicted in FIG. 1 is exemplary only and is not meant to limit the scope of the invention or inventions described herein. For example, one or more implementations described herein may utilize a handheld computer. Those skilled in the art will appreciate the environment required to implement the systems and methods described herein.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 1, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 1 provide storage of computer-readable instructions, data structures, program modules, and other data for computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

WINDOWS NT Virtual Memory System

The WINDOWS NT virtual memory system has been available for several years and is well known in the art. WINDOWS CE utilizes a similar virtual memory system. A program running on WINDOWS NT or WINDOWS CE can utilize 32 bits of address space. All programs running on WINDOWS CE share a common 32-bit address space. This translates to four (4) gigabytes (GB) of virtual memory. The upper half of this is devoted to system code and data and is only visible to the process when it is in privileged mode. The lower half (2 GB) is available to the user program when it is in user mode, and to those user-mode system services called by the program. On WINDOWS CE, each application gets a 32 MB slot from the lower 2 GB of user space.

The RAM (Random Access Memory) of a computer running WINDOWS NT or CE is divided into two categories: non-paged and paged. Non-paged code or data must stay in memory and cannot be written to or retrieved from peripherals. Peripheral include disks, a local area network (LAN), a CD-ROM, and other devices. Paged memory is RAM which the system can use and later reuse to hold various pages of memory from peripherals. Paged memory is divided into page frames, that hold various pages from time to time.

Page size varies with the computer's processor type. For example, page size is 4096 bytes (4K) for 386, 486 and Pentium-class processors, and the same for MIPS and ARM processors. When a page of code or data is required from a peripheral, the memory manager finds a free page frame in which to place the required page. The system transfers the required page, and processing continues. If no page frame is free, the memory manager must select one to reuse. The memory manager tries to find a page frame whose contents have not been referenced for a while. When the memory manager finds a suitable page frame, it discards the page in it.

Normally, programs execute by fetching one instruction after another from a code page (a page that contains program instructions) until they call or return to a routine in some other code page or make a jump to code in another page. Or, they can simply run off the end of the current page and need the next page. Such a transfer of instruction control to a new page causes a page fault if the needed page is not currently in the working set of the process. The working set of the process is the set of pages currently visible to the process in RAM.

A page fault can be resolved quickly if the memory manager finds the page elsewhere in RAM. It might be in the working set of some other process or processes, or it might have been removed from the current process's working set by the memory manager in an overzealous attempt to keep the process trim and fit. The memory manager places such pages on a list of page frames called the standby list, and they can be reinserted into the working set of a process. But if the page is not in RAM, the memory manager must find a free page frame, or make one free as described above, and then fetch the required page from the peripheral. One characteristic of code pages is that it isn't normal for code to be modified while in RAM, so code pages can be discarded without being written back to disk.

Data pages, which contain data used by a program, are accessed in a somewhat more random fashion than code pages. Each instruction in a program can reference data allocated anywhere in the address space of a process. The principle, however, is much the same. If an attempt is made to access a data page not in the working set of the process, a page fault occurs. From that point on, the process is just as described for code pages.

Preferred Implementation

Figure 2:
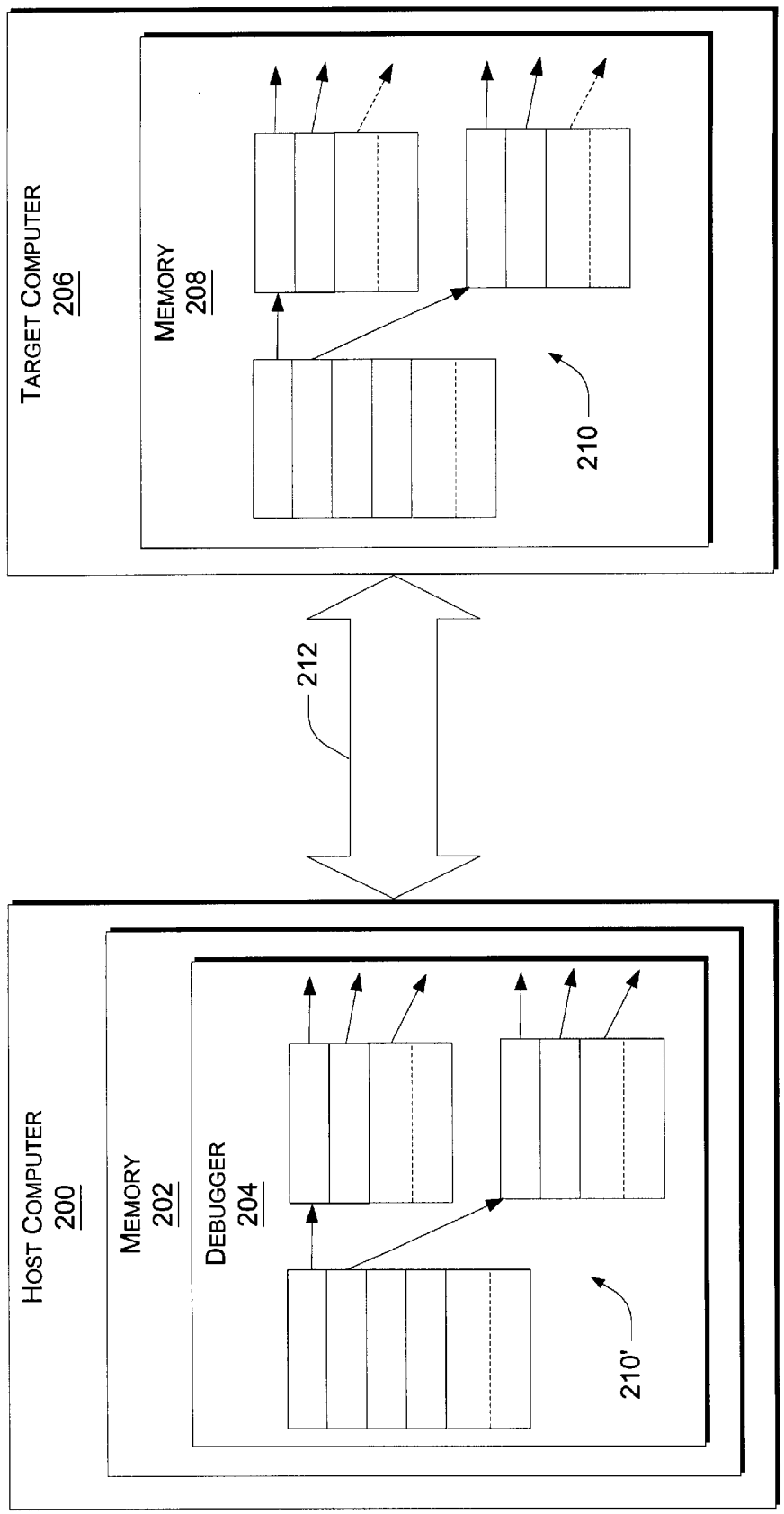
FIG. 2 is a block diagram of a host computer and a target computer, the diagram illustrating one implementation of the invention.

FIG. 2 is a high-level block diagram of a system in accordance with one implementation of the present invention, which will be used to discuss a broad overview of the invention. A host computer 200 includes memory 202. A debugger 204 is stored in the memory 202 of the host computer 200. A target computer 206 includes memory 208 that stores several translation tables 210.

The host computer 200 accesses the target computer 206 via an access mechanism 212 such as hardware-assisted debug probes. The translation tables 210 of the target computer 206 are replicated (translation tables 210') in the memory 202 of the host computer 200 by performing a similar operation that is performed by the target computer to realize the virtual memory. The translation tables 210' can then be used to translate physical memory addresses to virtual memory addresses. In one implementation, the virtual memory addresses are stored in the memory 202 of the host computer 200 after they are translated. The debugger 204 is now able to read the physical memory corresponding to the virtual addresses (translating) it required to access to potentially determine a cause of a fault in the target computer, by analyzing data produced from the replication.

Figure 3:
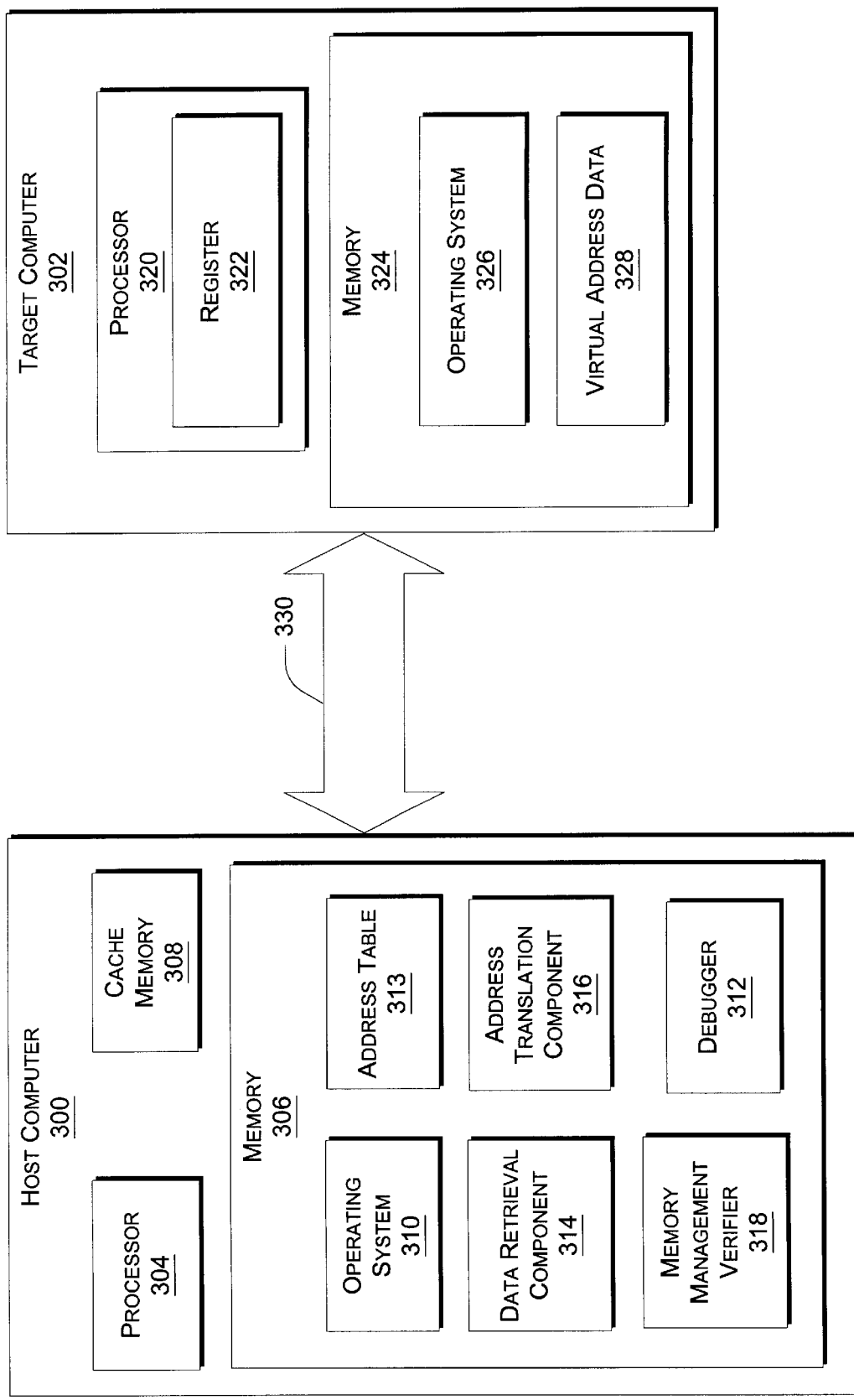
FIG. 3 is a block diagram of a host computer and a target computer.

FIG. 3 is a more detailed block diagram of a host computer 300 and a target computer 302 as implemented in the current invention. The host computer 300 includes a processor 304, memory 306 and cache memory 308. The memory 306 of the host computer 300 stores an operating system 310 that executes on the processor 304, a debugger 312, and an address table 313. The memory 306 also includes a data retrieval component 314, an address translation component 316, and a memory management identifier 318. The function of these components will be described in greater detail below.

The target computer 302 includes a processor 320 having a register 322. The register 322 may be one of several registers in the processor 320. The processor 320 of the target computer 302 supports fixed paged memory management. The target computer 302 also includes memory 324 that stores an operating system 326 and virtual address data 328. The operating system 326 uses the paged memory management that is supported by the processor 320. In the described implementation example, the operating system 326 is table driven, although in other implementations, the operating system may have hard-coded logic. A data link 330 enables data transfer between the host computer 300 and the target computer 302.

Although the systems and methods described herein can be implemented in numerous systems that utilize virtual memory management, the present discussion will use many terms and functions specific to the virtual memory management system that is utilized in the WINDOWS CE and WINDOWS NT operating systems produced by MICROSOFT CORPORATION. However, this is not intended to limit the scope of the invention to these specific products.

Figure 4:
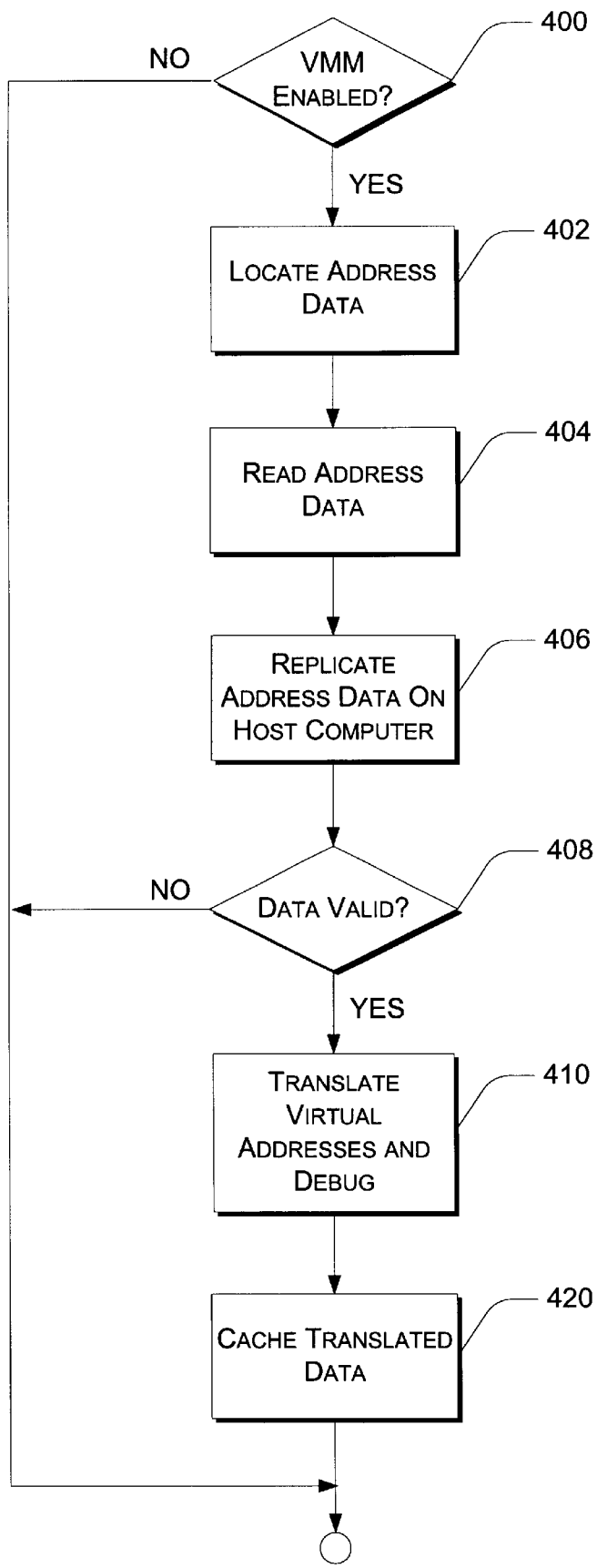
FIG. 4 is a flow diagram depicting a method for replicating and translating virtual address data from a target computer on a host computer.

FIG. 4 is a flow diagram of a method to replicate virtual memory data from the target computer 302 on the host computer 300. Continuing reference will be made to the elements and reference numerals contained in FIG. 3. The following discussion assumes that a connection has been made between the host computer 300 and the target computer 302.

At step 400, the memory management identifier determines if the memory management unit of the target processor 320 is enabled. This process is specific to the type of processor 320 that is in the target compute 302. Typically, making this determination requires locating and reading a value contained in the register 322 of the processor 320. If the memory management unit is disabled ("No" branch, step 400), then the procedure cannot continue.

If memory management is enabled on the processor 320 ("Yes" branch, step 400), then the data retrieval component 314 locates the data used by the target computer 302 to perform memory translations (step 402). This requires knowing exactly where in the memory 324 the virtual address data 328 is stored. If only the virtual address is known, then the translation can be performed on the host computer 300 by looking at content of a certain register 322 in the target processor (CPU Table Look-aside Buffer (TLB) register). The absolute location is normally given by accessing a binary file that contains the image downloaded on the target computer 302 and certain symbolic debug information.

At step 404, the address translation component 316 then reads the virtual address data 328 on the target computer 302 and replicates the data on the host side at step 406. This is the data that is used by the target computer 302 to perform virtual memory translations. This procedure is done through an available target access application program interface (API) such as the eXDI API in Platform Builder for WINDOWS CE 3.0, that typically makes use of hardware-assisted equipment to read the target memory 324 directly. The virtual address data 328 typically comprises tables that store data that can be used to determine a virtual address that is represented by a physical address. However, depending on the type of virtual memory management utilized on the target computer, the virtual address data 328 may comprise some other sort of data.

In the preferred implementation, the virtual address data 328 is validated at step 408. This is necessary to prevent false translation in the case that the target operating system 366 is not initialized, is partially initialized, corrupted, or in the process of updating its tables. This can be achieved by any method known in the art, such as by using redundant information and markers within fields of tables. If the virtual address data 328 is not valid, then the processing is termination ("No" branch, step 408). If the virtual address data 328 is valid ("Yes" branch, step 410), then the processing continues at step 412.

At step 412, the virtual address data 328 is translated by the address translation component 316 of the host computer 300. This process takes the contents of the physical memory 324 of the target computer 302 and applies the same process that the target computer 302 operating system 326 uses to utilize virtual memory addressing. The details of this task are specific to the virtual memory management scheme utilized by the operating system 326 and each particular VMM scheme will be appreciated by those skilled in the art.

Also at step 412, the debugger 312 is used to debug a fault on the target computer 302 by using the translated virtual memory data. The presence of a fault to debug is not required for the present invention, but is indicated as the typical debugger usage step. This step is shown as being combined with the translation because the debugging can be done as the virtual memory data 328 is being translated. In one implementation, the translated virtual memory data is cached in the cache memory 308 at step 420. This can be done either before or after the debugging process. If done before, the data is cached and the debugging is performed on the data stored in the cache memory 308. If done after, the debugging is done as the data is being translated, then the translated data is cached so it can be referenced at a later time, if necessary.

Although not required, caching is desirable because it speeds up success translations. Some data can be saved permanently for an execution session (after initialization of the target operating system 326 to the next reset), such as page size and the root to the virtual address data 328. All the other data can be cached while the processor 320 on the target computer 302 is halted. The replication of linked data structure (tables containing pointers to other tables) implies "fixing up" the pointers as the pointed tabled are replicated.

Conclusion

The system and methods as described, thus provide a manner in which a halted system can be debugged by replicating the virtual memory data from the target system on the host system. After the virtual memory data is replicated on the host system, debugging is performed on the data on the host system. This simulates debugging on the target computer, which cannot be performed directly because the processor on the target computer has halted execution.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A method for debugging a target computer that utilizes virtual memory paging, the method comprising:
   transferring physical memory data from the target computer to a host computer;
   replicating virtual memory data from the physical memory data on the host computer; and
   whereby a caching scheme is utilized that assumes that a root of memory tables contained in the physical memory data is fixed and does not change after it is initialized.

2. The method as recited in claim 1, further comprising debugging a fault on the target computer by analyzing replicated data on the host computer.

3. The method as recited in claim 1, further comprising caching the replicated data in memory on the host computer.

4. The method as recited in claim 1, wherein the target computer includes an operating system that uses table-driven paged memory management.

5. The method as recited in claim 1, wherein:
   the target computer includes a processor that has halted execution; and
   the virtual memory data is located in physical memory of the target computer.

6. A method for debugging a target computer that utilizes virtual memory paging, the method comprising:
   transferring physical memory data from the target computer to a host computer;
   replicating virtual memory data from the physical memory data on the host computer; and
   wherein the target computer includes an operating system that uses paged memory management that has hard-coded logic.

7. A method for debugging a target computer that utilizes virtual memory paging, the method comprising:
   transferring physical memory data from the target computer to a host computer;
   replicating virtual memory data from the physical memory data on the host computer; and
   wherein the target computer includes a processor that has halted execution; and the virtual memory data is located in a known address range of virtual memory having pages that are locked.

8. A host computing system, comprising:
   a processor;
   memory;
   means for establishing a connection between the memory and memory of a target computer that supports fixed page memory management;
   a data retrieval component configured to transfer address data from memory of the target computer to the memory; and
   an address translation component configured to replicate virtual memory addresses from the address data in the memory.

9. The host computing system as recited in claim 8, further comprising cache memory configured to store the replicated virtual memory addresses.

10. The host computing system as recited in claim 8, wherein the host-side address translation component is further configured to validate the replicated virtual memory addresses.

11. The host computing system as recited in claim 8, further comprising a memory management verifier that verifies that a processor of the target computing system has memory management enabled.

12. The host computing system as recited in claim 8, wherein the means for establishing a connection between the memory and memory of a target computer comprises hardware-assisted debug probes.

13. A host computing system, comprising:
   a processor;
   memory;
   means for establishing a connection between the memory and memory of a target computer that includes an operating system that supports table-driven fixed page memory management;
   a data retrieval component configured to transfer address data from memory of the target computer to the memory; and
   an address translation component configured to replicate virtual memory addresses from the address data in the memory.

14. A host computing system, comprising:
   a processor;
   memory;
   means for establishing a connection between the memory and memory of a target computer that includes an operating system that supports fixed page memory management that has hard coded logic;
   a data retrieval component configured to transfer address data from memory of the target computer to the memory; and
   an address translation component configured to replicate virtual memory addresses from the address data in the memory.

15. A host computing system, comprising:
   a processor;
   memory;
   means for establishing a connection between the memory and memory of a target computer;

a data retrieval component configured to transfer address data from memory of the target computer to the memory;

an address translation component configured to replicate virtual memory addresses from the address data in the memory; and a debugger to debug a fault that occurred in the target computer by processing data using the virtual memory addresses.

16. A method, comprising:

accessing address tables from physical memory of a target computer system;

replicating the address tables on a host computing system;

using data contained in the address tables to derive virtual address data that was used on the target computer system; and debugging a fault that occurred on the target computer by analyzing the replicated address tables on the host computer system.

17. The method as recited in claim 16, further comprising storing the address tables in memory on the host computer system.

18. The method as recited in claim 16, further comprising caching the virtual address data on the host computer system.

19. The method as recited in claim 16, wherein the virtual address data on the host computer system is identical to virtual address data on the target computer system.

20. The method as recited in claim 16, further comprising determining if memory management of a target computer system processor is enabled.

21. The method as recited in claim 16, further comprising performing the method only if memory management of a target computer system processor is enabled.

22. The method as recited in claim 16, wherein the accessing further comprises:

locating the address tables in physical memory of the target computer system; and reading the address tables from the target computer.

23. The method as recited in claim 16, further comprising validating the virtual address data to ensure it is identical to the virtual address data stored on the target computer system.

24. A method, comprising:

accessing address tables from physical memory of a target computer system;

replicating the address tables on a host computing system;

using data contained in the address tables to derive virtual address data that was used on the target computer system; and debugging a fault that occurred on the target computer by analyzing the virtual address data on the host computer system.

25. A computer-readable medium containing processor-executable instructions that, when executed on a processor, perform the method of claim 16.

26. One or more computer-readable media containing computer-executable instructions that, when executed by a computer, perform the following steps:

transferring physical memory data contained of a target computer to a host computer;

translating address data contained in the physical memory data to virtual addresses utilized by the target computer; and debugging a fault that occurred on the target computer by processing the transferred physical memory contents at the host.

27. The one or more computer-readable media as recited in claim 26, further comprising computer-executable instructions that, when executed by a computer, perform the following steps:

locating address data in the physical memory of the target computer; and transferring only the address data to the host computer.

28. The one or more computer-readable media as recited in claim 26, further comprising computer-executable instructions that, when executed by a computer, caches data transferred from the target computer on the host computer.

29. The one or more computer-readable media as recited in claim 26, further comprising computer-executable instructions that, when executed by a computer, validating the transferred data to determine if the transferred data is identical to the contents of the physical memory.

30. The one or more computer-readable media as recited in claim 26, further comprising computer-executable instructions that, when executed by a computer, determining if memory management is enabled on a processor in the target computer prior to transferring data.

* * * * *